US012628722B2

(12) United States Patent
Nagata et al.

(10) Patent No.: US 12,628,722 B2
(45) Date of Patent: May 19, 2026

(54) METHOD AND SYSTEM FOR ESTIMATING IMPLEMENT CONNECTED TO WORK VEHICLE

(71) Applicant: Kubota Corporation, Osaka (JP)

(72) Inventors: Masahiro Nagata, Sakai (JP); Takafumi Nozaki, Sakai (JP); Daijiro Furukawa, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 61 days.

(21) Appl. No.: 18/757,833

(22) Filed: Jun. 28, 2024

(65) Prior Publication Data

US 2025/0000008 A1     Jan. 2, 2025

(30) Foreign Application Priority Data

Jun. 29, 2023     (JP) ................................. 2023-107532

(51) Int. Cl.
A01B 76/00          (2006.01)

(52) U.S. Cl.
CPC .................................... A01B 76/00 (2013.01)

(58) Field of Classification Search
CPC ......... A01B 76/00; A01B 59/00; G06Q 50/02
See application file for complete search history.

(56) References Cited

U.S. PATENT DOCUMENTS 6,144,910 A * 11/2000 Scarlett et al. ...... A01B 63/023
2013/0046525 A1* 2/2013 Ali et al. ............. G05B 19/418

2018/0225895 A1    8/2018 Oda et al.
2018/0359919 A1* 12/2018 Blank et al. ......... A01D 41/127
2019/0183031 A1    6/2019 Berger et al.
2022/0232751 A1    7/2022 Zerbino

FOREIGN PATENT DOCUMENTS

| DE | 102013221757 | * | 4/2015 |
| EP | 3243367 A2 | | 11/2017 |
| EP | 4032381 A1 | | 7/2022 |
| JP | 2021043648 A | | 3/2021 |
| JP | 2021-087361 A | | 6/2021 |
| JP | 2021-089477 A | | 6/2021 |
| JP | 2021089477 | * | 6/2021 |
| WO | 2018/011999 A1 | | 1/2018 |

OTHER PUBLICATIONS

Official Communication issued in corresponding European Patent Application No. 24185001.5, mailed on Dec. 5, 2024, 8 pages.

* cited by examiner

*Primary Examiner* — Brodie J Follman
(74) *Attorney, Agent, or Firm* — Keating & Bennett, LLP

(57) ABSTRACT

A method to be executed by one or more computers configured or programmed to communicate with a work vehicle to execute work by driving an implement connected to the work vehicle includes repeatedly acquiring, from the work vehicle, 10 or more signals respectively indicating different internal states of the work vehicle, generating input data based on the 10 or more signals; estimating a type of the implement by inputting the input data to one or more trained models usable to estimate the type of the implement based on the input data, and generating output data including information indicating the estimated type of the implement and outputting the output data.

15 Claims, 15 Drawing Sheets

*FIG. 8*

| DATE AND TIME | S1 | S2 | S3 | S4 | . . . |
|---|---|---|---|---|---|
| 2022/7/27 07:28:00 | 1 | 0 | 63 | 120000 | . . . |
| 2022/7/27 07:28:01 | 1 | 0 | 63 | 120000 | . . . |
| 2022/7/27 07:28:02 | 0 | 775.5 | 63 | -29280 | . . . |
| 2022/7/27 07:28:03 | 0 | 780.0 | 63 | -28920 | . . . |
| . . . | . . . | . . . | . . . | . . . | . . . |

*FIG. 14*

IMPLEMENT 3

METHOD AND SYSTEM FOR ESTIMATING IMPLEMENT CONNECTED TO WORK VEHICLE

CROSS-REFERENCE TO RELATED APPLICATION

This application claims the benefit of priority to Japanese Patent Application No. 2023-107532, which was filed on Jun. 29, 2023, the entire contents of which are hereby incorporated by reference.

BACKGROUND OF THE INVENTION

1. Field of the Invention

The present disclosure relates to methods and systems for estimating an implement connected to a work vehicle.

2. Description of the Related Art

There has been an increasing need for predictive maintenance in which states of a vehicle are remotely monitored to grasp or predict a failure or a malfunction therein and perform maintenance such as replacement or repair of parts thereof. In order to perform the predictive maintenance, it is required to acquire various pieces of data indicating internal states of the vehicle and estimate an operating state of the vehicle based on those pieces of data.

In each of Japanese Patent Application Laid-Open No. 2021-089477 and Japanese Patent Application Laid-Open No. 2021-087361, there is disclosed a technique for automatically estimating a type of work performed by an implement attached to an agricultural tractor. In the technique disclosed in each of Japanese Patent Application Laid-Open No. 2021-089477 and Japanese Patent Application Laid-Open No. 2021-087361, a management server estimates the type of work executed by the implement based on position information at each time and operation information at each time, which have been transmitted from the tractor, and a machine learning model that is previously trained. Examples of the operation information include a vehicle speed, ON/OFF information on an engine, the number of revolutions of the engine, ON/OFF information on a PTO clutch, the number of revolutions of the PTO clutch, and an engine load factor.

SUMMARY OF THE INVENTION

It is important for distributors such as dealers that provide services such as maintenance or failure repair of work vehicles such as agricultural tractors or for manufacturers of the work vehicles, to grasp how the work vehicles are usually used. In particular, a wide variety of implements may be connected to the work vehicles, and hence it is important to grasp what kind of implement is being used to perform what kind of work, in order to improve quality of services or products.

With the aforementioned related-art techniques, it is possible to determine the type of work that has been executed, but it is not possible to accurately distinguish a wide variety of implements.

Example embodiments of the present invention provide techniques for estimating a type of an implement connected to a work vehicle more accurately.

A method according to an example embodiment of the present disclosure is executed by one or more computers configured or programmed to communicate with a work vehicle to execute work by driving an implement connected to the work vehicle. The method includes repeatedly acquiring, from the work vehicle, 10 or more signals respectively indicating different internal states of the work vehicle, generating input data based on the 10 or more signals, estimating a type of the implement by inputting the input data to one or more trained models usable to estimate the type of the implement based on the input data, and generating output data including information indicating the estimated type of the implement and outputting the output data.

General or specific aspects of various example embodiments of the present disclosure may be implemented using a device, a system, a method, an integrated circuit, a computer program, a non-transitory computer-readable storage medium, or any combination thereof. The computer-readable storage medium may be inclusive of a volatile storage medium, or a non-volatile storage medium. The device may include a plurality of devices. In the case where the device includes two or more devices, the two or more devices may be disposed within a single apparatus, or divided over two or more separate apparatuses.

According to the example embodiments of the present disclosure, it is possible to estimate the type of the implement connected to the work vehicle more accurately.

The above and other elements, features, steps, characteristics and advantages of the present invention will become more apparent from the following detailed description of the example embodiments with reference to the attached drawings.

BRIEF DESCRIPTION OF THE DRAWINGS

FIG. 8 is a table for schematically showing an example of chronological data.

FIG. 14 is a graph for showing an example of a signal waveform in a case where the implement is a seed drill.

DETAILED DESCRIPTION OF THE EXAMPLE EMBODIMENTS

Figure 1:
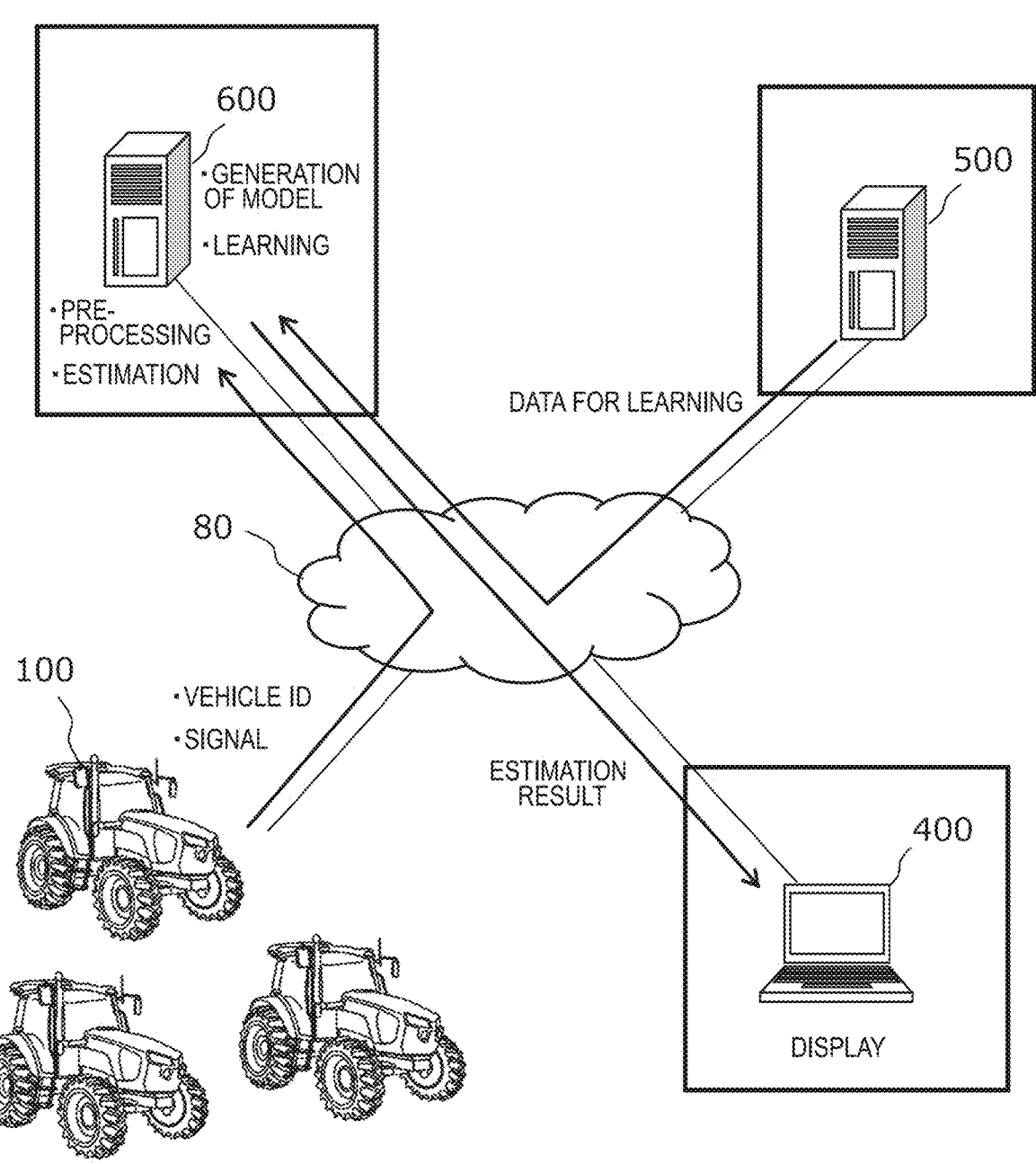
FIG. 1 is a diagram for schematically illustrating a configuration example of a system according to an illustrative example embodiment of the present invention.

Hereinafter, example embodiments of the present disclosure are described more specifically. Note however that unnecessarily detailed descriptions may be omitted. For example, detailed descriptions on what is well known in the art or redundant descriptions on what is substantially the same configuration may be omitted. This is to avoid lengthy description, and facilitate the understanding of those skilled in the art. The accompanying drawings and the following description, which are provided by the present inventors so that those skilled in the art can sufficiently understand the present disclosure, are not intended to limit the scope of claims. In the following description, component elements having identical or similar functions are denoted by identical reference numerals.

The following example embodiments are only exemplary, and the techniques according to the present disclosure are not limited to the following example embodiments. For example, numerical values, shapes, steps, and orders of steps, layout of a display screen, etc., that are indicated in the following example embodiments are only exemplary, and allow for various modifications so long as it makes technological sense. Any one implementation may be combined with another so long as it makes technological sense to do so.

FIG. 1 is a diagram for schematically illustrating a configuration example of a system according to an illustrative example embodiment of the present disclosure. This system is a system for remotely monitoring an operating state of one or more work vehicles 100.

The system illustrated in FIG. 1 includes a plurality of work vehicles 100, a server computer 600 (hereinafter referred to as "server 600"), a dealer terminal 400 provided at a dealer of the work vehicles 100, and a manufacturer computer 500 managed by a manufacturer of the work vehicles 100. The server 600 may be, for example, a cloud server disposed in a data center. Each of the work vehicles 100, the dealer terminal 400, and the manufacturer computer 500 is configured or programmed to be able to communicate with the server 600 via a network 80. In the example of FIG. 1, the system includes a plurality of work vehicles 100, but the number of work vehicles 100 may be one.

The work vehicle 100 and the dealer terminal 400 may be used in, for example, the same region or country. Each of the manufacturer computer 500 and the server 600 may be provided in a different region or country from that of the work vehicle 100 and the dealer terminal 400. Each of the manufacturer computer 500 and the server 600 may be an aggregate of a plurality of computers. The server 600 may be a cloud server managed by a provider that provides a machine learning service. In that case, the server 600 may be disposed in a country different from any of the work vehicle 100, the dealer terminal 400, or the manufacturer computer 500. The server 600 may be an aggregate of a plurality of computers distributed in different regions or countries.

The work vehicle 100 according to the present example embodiment is a tractor capable of executing farm work while traveling in a field. The work vehicle 100 is not limited to the tractor, and may be any other type of agricultural work vehicle, e.g., a transplanter or a harvester. Alternatively, the work vehicle 100 may be a vehicle for use in a non-agricultural application, e.g., a construction vehicle.

The work vehicle 100 is capable of having an implement connected to the front or rear of the work vehicle 100. The work vehicle 100 can drive an implement to execute farm work corresponding to the implement. There are various types of implements, and it is possible to execute different types of farm work by replacing the implement.

The work vehicle 100 according to the present example embodiment includes a communication device (also referred to as "direct communication unit") to communicate with the server 600. The communication device is configured or programmed to repeatedly transmit, to the server 600, a plurality of signals respectively indicating different internal states of the work vehicle 100. The type of signal varies, and, for example, 10 or more, 20 or more, 50 or more, 100 or more, or 200 or more signals are transmitted from the communication device of the work vehicle 100 to the server 600. These signals may be generated based on signals that are transmitted between a plurality of sensors and a plurality of electronic control units (ECUs) in the work vehicle 100. For example, each signal may be a signal flowing through a bus such as a CAN (Control Area Network) in the work vehicle 100 or a signal processed based on a signal flowing through the bus. In the present example embodiment, the plurality of signals that are transmitted from the work vehicle 100 to the server 600 may include not only signals indicating a vehicle speed, ON/OFF information on an engine, the number of revolutions of the engine, ON/OFF information on a PTO clutch, the number of revolutions of the PTO clutch, and an engine load factor, which are disclosed in, for example, Japanese Patent Application Laid-Open No. 2021-089477 and Japanese Patent Application Laid-Open No. 2021-087361, but also a larger number of signals. The signals that are transmitted may include one or more of the following signals, for example.

A signal indicating a measurement value of a draft sensor to measure a load involved in towing of an implement A signal indicating a traveling speed (vehicle speed) of a work vehicle A signal indicating a rotational speed of a power take-off (PTO) shaft to drive the implement A signal indicating a height position of a linkage device (e.g., three-point hitch) that links the implement A signal indicating a rotational speed of a prime mover (engine)

A signal indicating a position of a hand accelerator

A signal indicating a torque acting on the engine

A signal indicating a traveling direction of the work vehicle

A signal indicating a position of the work vehicle

A signal indicating a gear shift state

A signal indicating a basic statistic such as an average value, a standard deviation, or a variance of each of such signals for over a predetermined time (e.g., 10 seconds, 30 seconds, or 60 seconds) may be included in the signals that are transmitted. Each signal may be transmitted in association with a vehicle ID that is an identifier of the work vehicle 100 and time information (time stamp) indicating a generation time of that signal. For example, the communication device of the work vehicle 100 may be configured or programmed to repeatedly transmit a plurality of signals to the server 600 at a predetermined time interval (for example, an interval of 0.5 seconds, 1 second, 2 seconds, or the like). This time interval may be set to a value of, for example, not more than 5 seconds, more preferably, not more than 2 seconds. A frequency of transmission may differ depending on the signal. For example, a signal having a value that does not frequently change, such as a signal indicating the height position of the three-point hitch, may be transmitted only when the value has changed.

The server 600 is configured or programmed to function as a processor to acquire a plurality of signals from the work vehicle 100 and estimate the type of an implement connected to the work vehicle 100 based on these signals. The server 600 performs pre-processing on the acquired plurality of signals, to thereby generate a plurality of pieces of chronological data respectively corresponding to the plurality of signals. For example, the server 600 generates chronological data having values of the respective signals obtained every fixed time (e.g., every 0.5 seconds, every 1 second, or every 2 seconds), and generates input data based on the chronological data. The pre-processing may include, for example, processing for re-sampling the values of the transmitted signals at an interval of a fixed time (e.g., 1 second), complementing missing data, or correcting an outlier. The server 600 generates input data indicating changes over time of a plurality of feature amounts based on the chronological data including the values of the respective signals at each time which have been subjected to the pre-processing. The feature amount may be obtained through calculation of, for example, a moving average, a change rate, or a moving standard deviation of signal values. As the feature amounts, for example, a moving average of the vehicle speed, a moving standard deviation of an acceleration, a moving average of a draft sensor value, a change rate of the number of revolutions of the engine, and a moving standard deviation of a hitch position may be generated. In the following description, the feature amount included in the input data may also be referred to as "signal".

In a storage of the server 600, one or more previously-trained machine learning models (trained models) are stored. This model is usable to estimate the type of an implement based on the input data. The model is generated by a command from the manufacturer computer 500, and trained through use of data for learning which is transmitted from the manufacturer computer 500 as occasion demands. The server 600 estimates the type of an implement 300 by inputting input data to the trained model.

As a machine learning algorithm to be utilized, for example, an algorithm based on a decision tree may be used. Utilization of a decision tree clarifies what kind of determination criterion has been used to estimate the type of the implement, and therefore facilitates improvement of the model compared to another black-box model using an unknown determination criterion. As the algorithm based on a decision tree, for example, ID3, C4.5, CART, CHAID, or a random forest may be used. Not only the algorithm that utilizes a decision tree but also another machine learning algorithm such as a neural network or a support vector machine may be used.

As described later in detail, the trained model may include a first model usable to determine whether the work vehicle 100 is working or is in another state and a second model for identifying the type of the implement connected to the work vehicle 100. In that case, the server 600 may be configured or programmed to estimate the implement using the second model only when it has been determined that the work vehicle 100 is working through estimation using the first model. Such two-step estimation enables the type of the implement 300 to be estimated more accurately than in a case where the implement is estimated at one step.

When the server 600 has estimated the type of the implement, the server 600 generates output data including information indicating the estimated type of the implement. The output data may be generated constantly (e.g., every 0.5 seconds, every 1 second, or every 2 seconds) while the work vehicle 100 is operating, for example. The output data may include not only the estimated type of the implement but also information indicating the operating state of the work vehicle 100. The information indicating the operating state may include information such as whether the work vehicle is working, is in a state of traveling without working (referred to as "is traveling without working"), is in a state of turning on a headland (referred to as "is turning on the headland"), or is idling. In addition, the information indicating the operating state may include information such as a vehicle speed, a fuel rate, or total operation hours from a certain moment. The server 600 transmits the output data to another computer such as the dealer terminal 400.

The dealer terminal 400 is a terminal device that is used by a monitor (e.g., a person in charge at the dealer) who performs condition monitoring, maintenance, or failure diagnosis of the work vehicle 100. The dealer terminal 400 illustrated in FIG. 1 is a laptop PC (Personal Computer) and includes a built-in display. The dealer terminal 400 may be a desktop PC to which a display is externally mounted. Alternatively, the dealer terminal 400 may be any other type of computer such as a tablet computer or a smartphone. The dealer terminal 400 causes the display to display information indicating the operating state of the work vehicle 100 in chronological order based on the output data transmitted from the server 600. The information indicating the operating state in chronological order may include, for example, information indicating presence or absence of work per day and time slot, the type of work, or the type of the used implement. The monitor can grasp, based on the displayed information, how the work vehicle 100 is being used in real time.

The dealer of the work vehicle 100 performs a task of selling or lending the work vehicle 100 to a user or a farmer, and also performs tasks such as maintenance and failure repair of the work vehicle 100. In order to perform tasks such as failure repair and maintenance, it is important to grasp how the work vehicle 100 is usually used. In particular, it is important to grasp what kind of implement is connected to the work vehicle 100 by the user to perform a task. However, according to the related art, it has not been possible to accurately grasp what kind of implement is attached to the work vehicle 100 for use, and it has not been possible to efficiently perform a task such as maintenance. In particular, when an area of which the dealer is in charge is large, it has been necessary to examine the state of each work vehicle by visiting a plurality of users scattered in the wide area for holding an interview, for example. According to the present example embodiment, the dealer can use the dealer terminal 400 to remotely grasp the type of the implement connected to each work vehicle 100 and the operating state of the work vehicle 100. Therefore, a frequency of visits can be reduced, and efficiency in task such as maintenance can be greatly improved.

The manufacturer computer 500 is configured or programmed to instruct the server 600 to generate and train the machine learning model. The manufacturer computer 500 may be any computer, for example, a server computer, a personal computer (PC), a tablet computer, or a smartphone. The manufacturer computer 500 may be used by a person in charge at the manufacturer, for example. The manufacturer computer 500 transmits the data for learning to the server 600 in response to an operation of the person in charge or in accordance with a set schedule. The server 600 performs training (learning) of the machine learning model based on the transmitted data for learning. The training of the model based on the data for learning may be performed daily, for example. This repeatedly improves the trained model, thus allowing for improving accuracy of estimation.

The server 600 may transmit, to the manufacturer computer 500, the output data including information such as the type of the implement connected to each work vehicle 100. In that case, the manufacturer can grasp how each work vehicle 100 is being used. Therefore, for example, when a malfunction or a failure occurs in the work vehicle 100, it becomes easier to identify a cause thereof. The manufacturer can make use of the information indicating the operating state of each work vehicle 100, which has been obtained from the server 600, for future product development.

Hereinafter, the configuration and operation of each component element are described in more detail.

Figure 2:
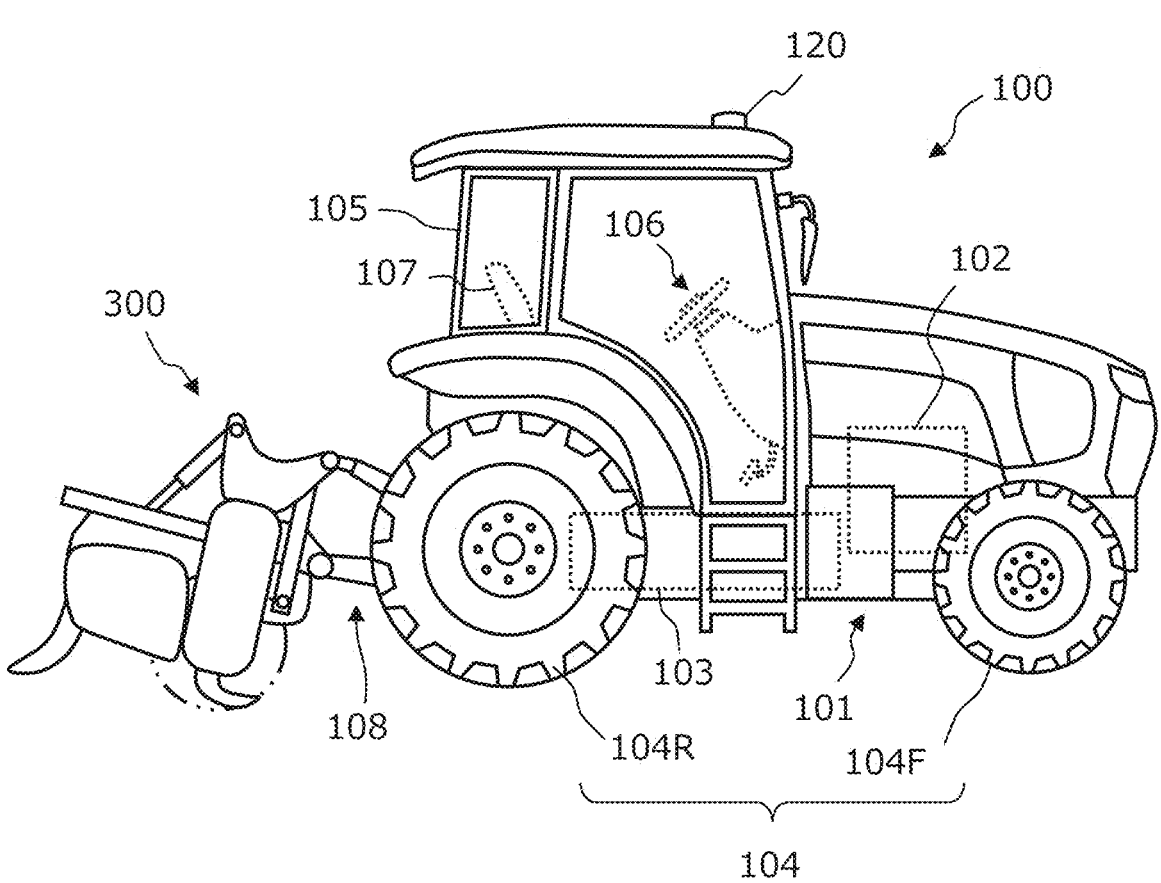
FIG. 2 is a side view for illustrating a work vehicle and an example of an implement that is linked to the work vehicle.

FIG. 2 is a side view for illustrating the work vehicle 100 and an example of the implement 300 that is linked to the work vehicle 100. The work vehicle 100 includes a vehicle body 101, a prime mover 102, and a transmission 103. On the vehicle body 101, tired wheels 104 and a cabin 105 are provided. The wheels 104 include a pair of front wheels 104F and a pair of rear wheels 104R. Inside the cabin 105, a driver's seat 107, a steering device 106, and switches for manipulation are provided. Either one or both of each front wheel 104F and each rear wheel 104R may be replaced by a plurality of wheels on which a track is worn (i.e., a crawler), rather than a tired wheel.

The work vehicle 100 further includes a GNSS unit 120. The GNSS (Global Navigation Satellite System) is a general term for satellite positioning devices, such as GPS (Global Positioning System), QZSS (Quasi-Zenith Satellite System, e.g., MICHIBIKI), GLONASS, Galileo, BeiDou, and the like. The GNSS unit 120 includes an antenna that receives a signal(s) from a GNSS satellite(s) and a processor that determines the position of the work vehicle 100 based on the signal(s) received by the antenna. The GNSS unit 120 receives GNSS signals transmitted from a plurality of GNSS satellites, and performs positioning based on the GNSS signals. The GNSS unit 120 in the present example embodiment is disposed above the cabin 105, but may be disposed at any other position.

The prime mover 102 may be a diesel engine, for example. Instead of a diesel engine, an electric motor may be used. The transmission 103 can change the propulsion and moving speed of the work vehicle 100 through a speed changing mechanism. The transmission 103 can also switch between forward travel and backward travel of the work vehicle 100.

The steering device 106 includes a steering wheel, a steering shaft connected to the steering wheel, and a power steering device to assist in the steering by the steering wheel. The front wheels 104F are the wheels responsible for steering, such that changing their angle of turn (also referred to as "steering angle") can cause a change in the traveling direction of the work vehicle 100. The steering angle of the front wheels 104F can be changed by manipulating the steering wheel. The power steering device includes a hydraulic device or an electric motor to supply an assisting force for changing the steering angle of the front wheels 104F. When automatic steering is performed, under the control of a controller disposed in the work vehicle 100, the steering angle may be automatically adjusted by the power of the hydraulic device or electric motor.

A linkage device 108 is provided at the rear of the vehicle body 101. The linkage device 108 may include, e.g., a three-point linkage (also referred to as a "three-point hitch"), a PTO (Power Take Off) shaft, a universal joint, and a communication cable. The linkage device 108 allows the implement 300 to be attached to or detached from the work vehicle 100. The linkage device 108 is able to raise or lower the three-point hitch with a hydraulic device, for example, thus controlling the position or pose of the implement 300. Moreover, motive power can be sent from the work vehicle 100 to the implement 300 via the universal joint. While towing the implement 300, the work vehicle 100 allows the implement 300 to perform a predetermined task. The linkage device may be provided frontward of the vehicle body 101. In that case, the implement may be connected frontward of the work vehicle 100.

Although the implement 300 illustrated in FIG. 2 is a rotary tiller, the implement 300 is not limited to a rotary tiller. For example, any implement such as a mower, a seeder, a spreader, a rake, a baler, a harvester, a sprayer, or a harrow, may be connected to the work vehicle 100 for use.

Figure 3:
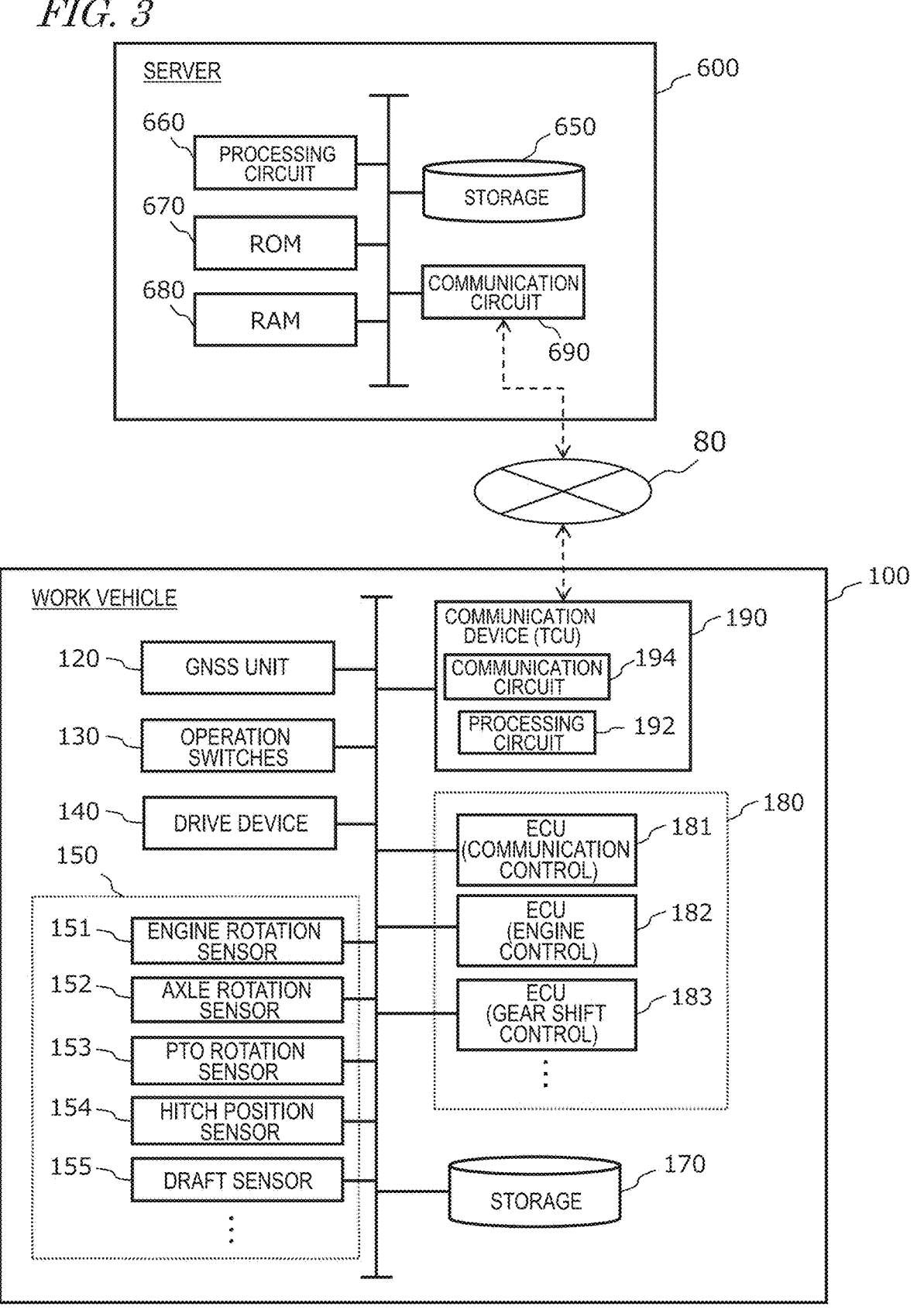
FIG. 3 is a block diagram for illustrating a configuration example of the work vehicle and a server.

FIG. 3 is a block diagram for illustrating a configuration example of the work vehicle 100 and the server 600. The work vehicle 100 in the example of FIG. 3 includes GNSS unit 120, operation switches 130, a drive device 140, sensors 150, a storage 170, a controller 180, and a communication device 190. These component elements may be connected to one another so as to be capable of communication via buses.

For example, the drive device 140 may include various devices that are needed for the traveling of the work vehicle 100 and the driving of the implement 300, e.g., the aforementioned prime mover 102, transmission 103, steering device 106, and linkage device 108. The prime mover 102 may include an internal combustion engine such as a diesel engine. Instead of an internal combustion engine or in addition to an internal combustion engine, the drive device 140 may include an electric motor that is dedicated to traction purposes.

The sensors 150 include various sensors such as an engine rotation sensor 151, an axle rotation sensor 152, a PTO rotation sensor 153, a hitch position sensor 154, and a draft sensor 155. The engine rotation sensor 151 measures the rotational speed of the engine, i.e., the number of revolutions per unit time (e.g., per minute). The axle rotation sensor 152 measures the rotational speed of an axle that is connected to the wheel 104. The PTO rotation sensor 153 measures the rotational speed of the PTO shaft. The hitch position sensor 154 measures the height position of the three-point hitch. The draft sensor 155 measures a load involved in towing of the implement 300. In addition, the sensors 150 may include various sensors such as a temperature sensor, a fuel sensor, a water temperature sensor, an oil level gauge, a shuttle sensor, a hand accelerator sensor, an accelerator pedal sensor, a main gear shift lever sensor, a range gear shift lever sensor, an accelerometer, and an angular velocity sensor. Signals output from these sensors may be sent to the controller 180 via buses, and transmitted to the server 600 by the communication device 190.

The controller 180 is an aggregate of a plurality of ECUs. The controller 180 includes, for example, an ECU 181 for communication control, an ECU 182 for engine control, and an ECU 183 for gear shift control. In addition, the controller 180 may include various ECUs such as an ECU for steering control, an ECU for PTO control, and an ECU for hydraulic control. The ECU 181 for communication control controls the transmission of signals performed by the communication device 190. Through the action of a plurality of ECUs included in the controller 180, traveling of the work vehicle 100, work performed by the implement 300, and communication with the server 600 are achieved. These ECUs can communicate with one another in accordance with a vehicle bus standard such as CAN. Each ECU may include one or more processors and one or more memories.

The communication device 190 is a device, e.g., a TCU (Telematics Control Unit), that performs wireless communication. The communication device 190 performs communications with the server 600 via the network 80. The network 80 may include, for example, a cellular mobile communication network such as 3G, 4G, or 5G, a wireless communication network such as Wi-Fi (Wireless Fidelity, trademark) or LPWA (Low Power Wide Area), and the Internet. The communication device 190 performs communications with the server 600 via network devices such as a plurality of routers and switches that are included in the network 80.

In accordance with an instruction from the ECU 181 for communication control in the controller 180, the communication device 190 transmits, to the server 600, data including a plurality of signals indicating the different internal states of the work vehicle 100. The communication device 190 includes a processing circuit 192 that generates data including the plurality of signals and a communication circuit 194 that wirelessly transmits the data. The communication device 190 transmits various signals flowing through the CAN bus to the server 600 at a predetermined time interval determined for each signal. Instead of being connected to the bus, the communication device 190 may be directly connected to the ECU 181 for communication control in the controller 180. The type of a signal to be transmitted by the communication device 190 may be set by the ECU 181 for communication control. The function of generating transmission data by the processing circuit 192 may be implemented in the ECU 181 for communication control in the controller 180. In that case, the combination of the ECU 181 for communication control and the communication device 190 may be referred to as "communication device".

The communication device 190 may be manufactured and sold independently from the work vehicle 100. For example, the communication device 190 may be later mounted to the work vehicle 100 provided with no communication device 190, thus achieving the communication function according to the present example embodiment.

The storage 170 includes one or more storage media including a flash memory or a magnetic disk. The storage 170 stores signals that are output from the sensors and various pieces of data that are generated by the controller 180. The storage 170 may be configured to also store a computer program(s) to cause the ECUs in the controller 180 to perform various operations. Such a computer program(s) may be provided for the work vehicle 100 via a storage medium (e.g., a semiconductor memory or an optical disc) or through telecommunication lines (e.g., the Internet). Such a computer program(s) may be marketed as commercial software.

Figure 4:
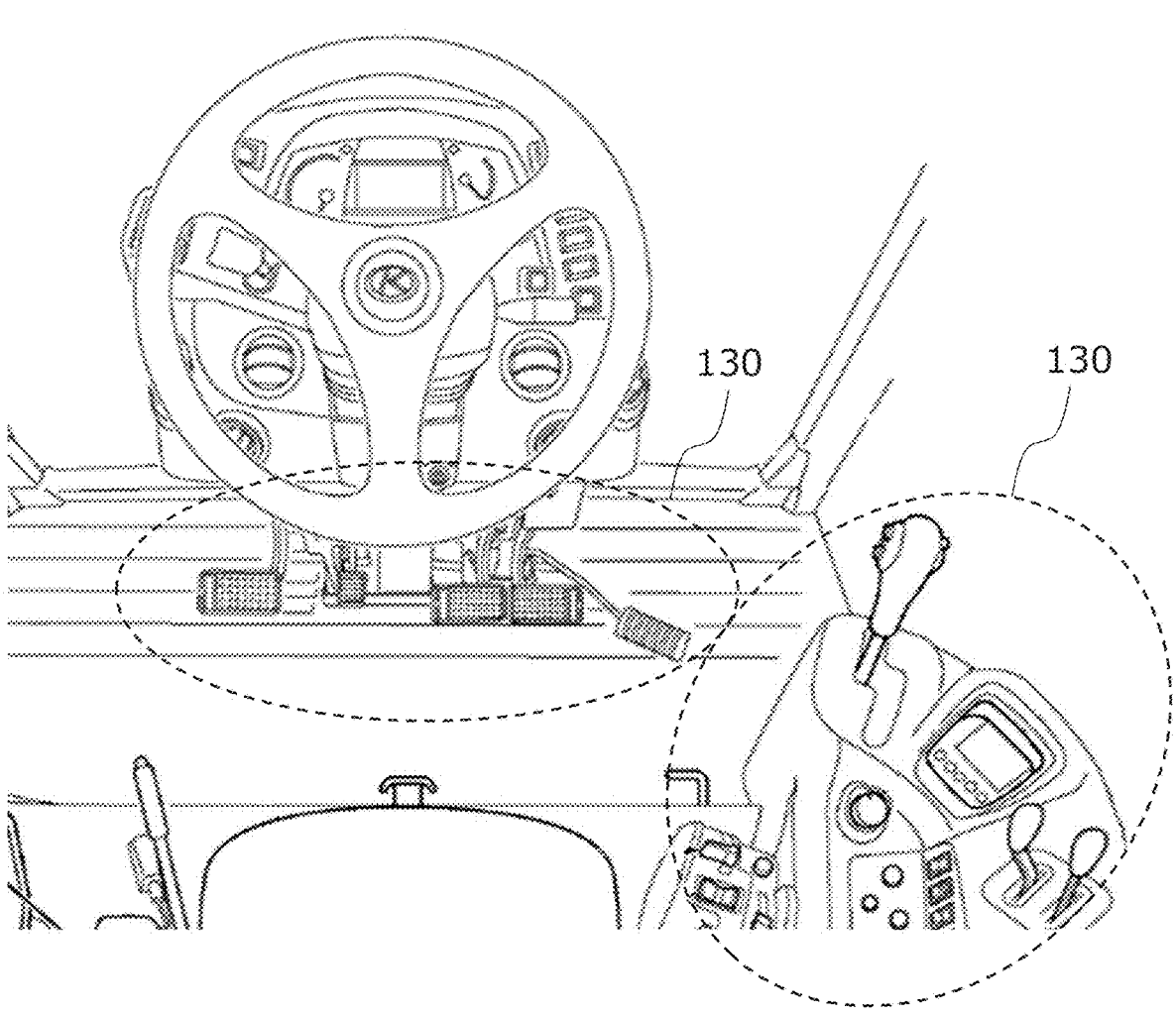
FIG. 4 is a view for illustrating an example of operation switches to be provided in a cabin.

FIG. 4 is a view for illustrating an example of the operation switches 130 to be provided in the cabin 105. In the cabin 105, the operation switches 130 including a plurality of switches (including buttons, levers, and pedals) that are manipulable to a user are disposed. The operation switches 130 may include, for example, a switch (e.g., a button) usable to switch a main gear shift, a switch (e.g., a shift lever) usable to switch a range gear shift, a switch (e.g., a shuttle lever) usable to switch between forward travel and backward travel, and a switch for raising or lowering the implement 300. Pedals such as a clutch pedal, an accelerator pedal, and a brake pedal are also included in the operation switches 130. Each of the switches is provided with a sensor for detecting a state of the switch. These sensors are also included in the sensors 150.

Next, a hardware configuration of the server 600 is described.

As illustrated in FIG. 3, the server 600 includes a storage 650, a processing circuit 660, a ROM (Read Only Memory) 670, a RAM (Random Access Memory) 680, and a communication circuit 690. These component elements are connected to one another so as to be capable of communication via buses.

The communication circuit 690 is a communication module to communicate with an external device such as the work vehicle 100 via the network 80. The communication circuit 690 can perform wired communication complying with a communication standard such as IEEE 1394 (trademark) or Ethernet (trademark), for example. The communication circuit 690 may perform wireless communication complying with the Bluetooth (trademark) standard or the Wi-Fi standard or cellular mobile communication such as 3G, 4G, or 5G.

The storage 650 may be, for example, a magnetic storage or a semiconductor storage. Examples of the magnetic storage include a hard disk drive (HDD). Examples of the semiconductor storage include a solid-state drive (SSD). The storage 650 may be a device provided separately from the server 600. For example, the storage 650 may be a storage, e.g., a cloud storage, that is connected to the server 600 via the network 80. The storage 650 may store data transmitted from the work vehicle 100 and one or more trained models usable to estimate the type of the implement 300 connected to the work vehicle 100.

The processing circuit 660 may be, for example, a semiconductor integrated circuit including a central processing unit (CPU). The processing circuit 660 may be implemented by a micro-processing circuit or a microcontroller. Alternatively, the processing circuit 660 may be implemented by an FPGA (Field Programmable Gate Array) equipped with a CPU, a GPU (Graphics Processing Unit), an ASIC (Application Specific Integrated Circuit), an ASSP (Application Specific Standard Product), or a combination of two or more circuits selected from among these circuits. The processing circuit 660 sequentially executes a computer program stored in the ROM 670, in which instructions for executing at least one kind of processing are described, thus achieving desired processing. For example, the processing circuit 660 estimates the implement 300 connected to the work vehicle 100 based on data transmitted from the communication device 190 of the work vehicle 100 and the trained model stored in the storage 650. The processing circuit 660 transmits output data including a result of the estimation to the dealer terminal 400 via the communication circuit 690. The processing circuit 660 also executes generation and training (learning) of the machine learning model based on a command from the manufacturer computer 500.

The ROM 670 is, for example, a writable memory (e.g., a PROM), a rewritable memory (e.g., a flash memory), or a read-only memory. The ROM 670 stores a program executable to control an operation of the processing circuit 660. The ROM 670 is not required to be a single storage medium, and may be an aggregate of a plurality of storage media. A portion of the aggregate of the plurality of storage media may be a removable memory.

The RAM 680 provides a work area to temporarily load a control program stored in the ROM 670 at a time of boot. The RAM 680 is not required to be a single storage medium, and may be an aggregate of a plurality of storage media.

Figure 5:
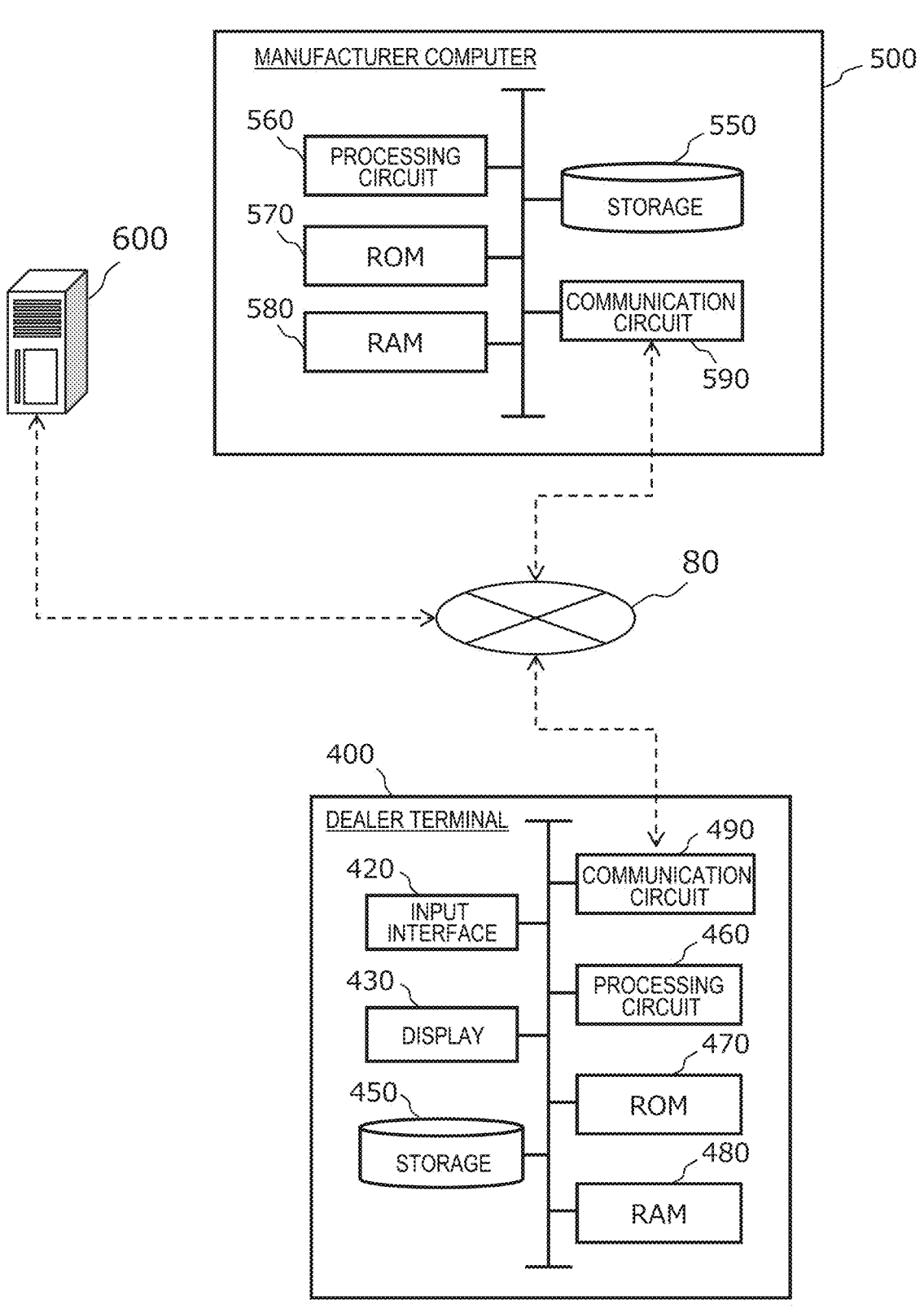
FIG. 5 is a block diagram for illustrating an example of hardware configurations of a dealer terminal and a manufacturer computer.

FIG. 5 is a block diagram for illustrating an example of hardware configurations of the dealer terminal 400 and the manufacturer computer 500.

The dealer terminal 400 includes an input interface 420, a display 430, a storage 450, a processing circuit 460, a ROM 470, a RAM 480, and a communication circuit 490. These component elements are connected to one another so as to be capable of communication via buses. The input interface 420 is a device to convert an instruction given from a user into data and inputting the data to the processing circuit 460. The input interface 420 may include, for example, a keyboard, a mouse, or a touch panel. The display 430 may be any display such as a liquid crystal display or an organic EL display. Hardware configurations of the processing circuit 460, the ROM 470, the RAM 480, the storage 450, and the communication circuit 490 are similar to hardware configurations of corresponding devices in the server 600. The dealer terminal 400 is used to request the server 600 for output data indicating the operating state of the work vehicle 100 and to display an image based on the output data.

The manufacturer computer 500 includes a processing circuit 560, a ROM 570, a RAM 580, a storage 550, and a communication circuit 590. Hardware configurations of the processing circuit 560, the ROM 570, the RAM 580, the storage 550, and the communication circuit 590 are similar to hardware configurations of corresponding devices in the server 600. The manufacturer computer 500 may be connected for use to input interfaces such as a keyboard and a mouse and a display such as a liquid crystal display or an organic EL display. Alternatively, the manufacturer computer 500 may include an input interface and a display. The manufacturer computer 500 is used to instruct the server 600 to generate and train the machine learning model.

Figure 6:
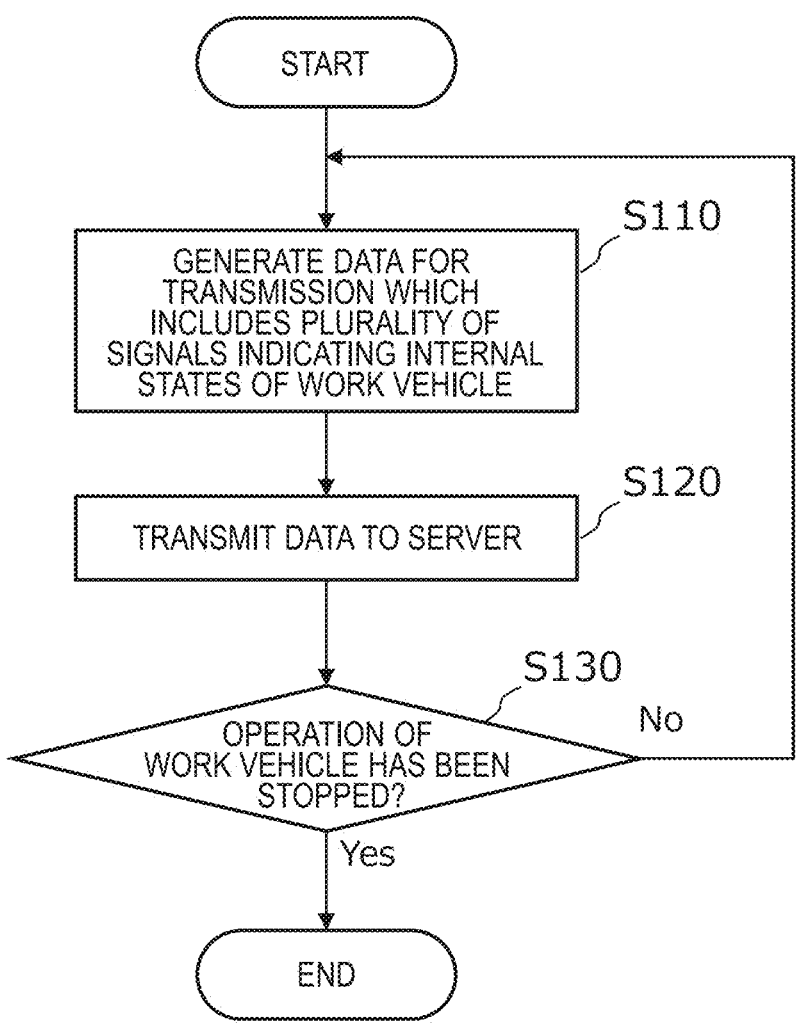
FIG. 6 is a flowchart for illustrating an example operation for data transmission to be performed by a communication device of the work vehicle.

FIG. 6 is a flowchart for illustrating an example operation for data transmission to be performed by the communication device 190 of the work vehicle 100. The communication device 190 repeats an operation from step S110 to step S130, to thereby sequentially transmit a plurality of signals indicating the internal states of the work vehicle 100 to the server 600. This operation may be constantly performed during an operation of the work vehicle 100 (e.g., during engine ON thereof).

At step S110, the processing circuit 192 of the communication device 190 generates data for transmission which includes a plurality of signals each indicating an internal state of the work vehicle 100. The number of types of the plurality of signals may be 10 or more, typically, 100 or more or 200 or more. These signals may be generated based on signals output from the sensors 150. Not only the signals themselves output from the sensors 150 but also a signal indicating a value such as an average value or a standard deviation of each type of signal for a predetermined time (e.g., 10 seconds) may be included in the data for transmission. The processing circuit 192 generates data in which each signal is associated with the vehicle ID and the time stamp indicating the generation time of that signal.

At step S120, the processing circuit 192 transmits the generated data to the server 600 via the communication circuit 194.

At step S130, the processing circuit 192 determines whether the operation of the work vehicle 100 has been stopped or not. The processing circuit 192 determines that the operation of the work vehicle 100 has been stopped when, for example, the engine has been turned off. When the operation of the work vehicle 100 has been stopped, the processing is ended. When the operation of the work vehicle 100 has not been stopped, the control returns to step S110.

During the operation of the work vehicle 100, the operation from step S110 to step S130 is repeated. The generation and transmission of data for transmission may be repeatedly executed at a predetermined time interval (e.g., an interval of 0.5 seconds, 1 second, or 2 seconds).

A combination of signals included in the data for transmission may be the same each time, or may be different for each time of transmission. For example, a signal(s) having a value that frequently changes, such as the vehicle speed and the number of revolutions of the engine, may be transmitted each time, while a signal(s) having a value that does not frequently change, such as the height position of the three-point hitch, may be transmitted only when the value changes. Which signals are to be transmitted and how frequently each signal is to be transmitted may be defined in a setting file created by the ECU 181 for communication control, for example. The communication device 190 may be configured to transmit specific signals in accordance with the setting file.

Figure 7:
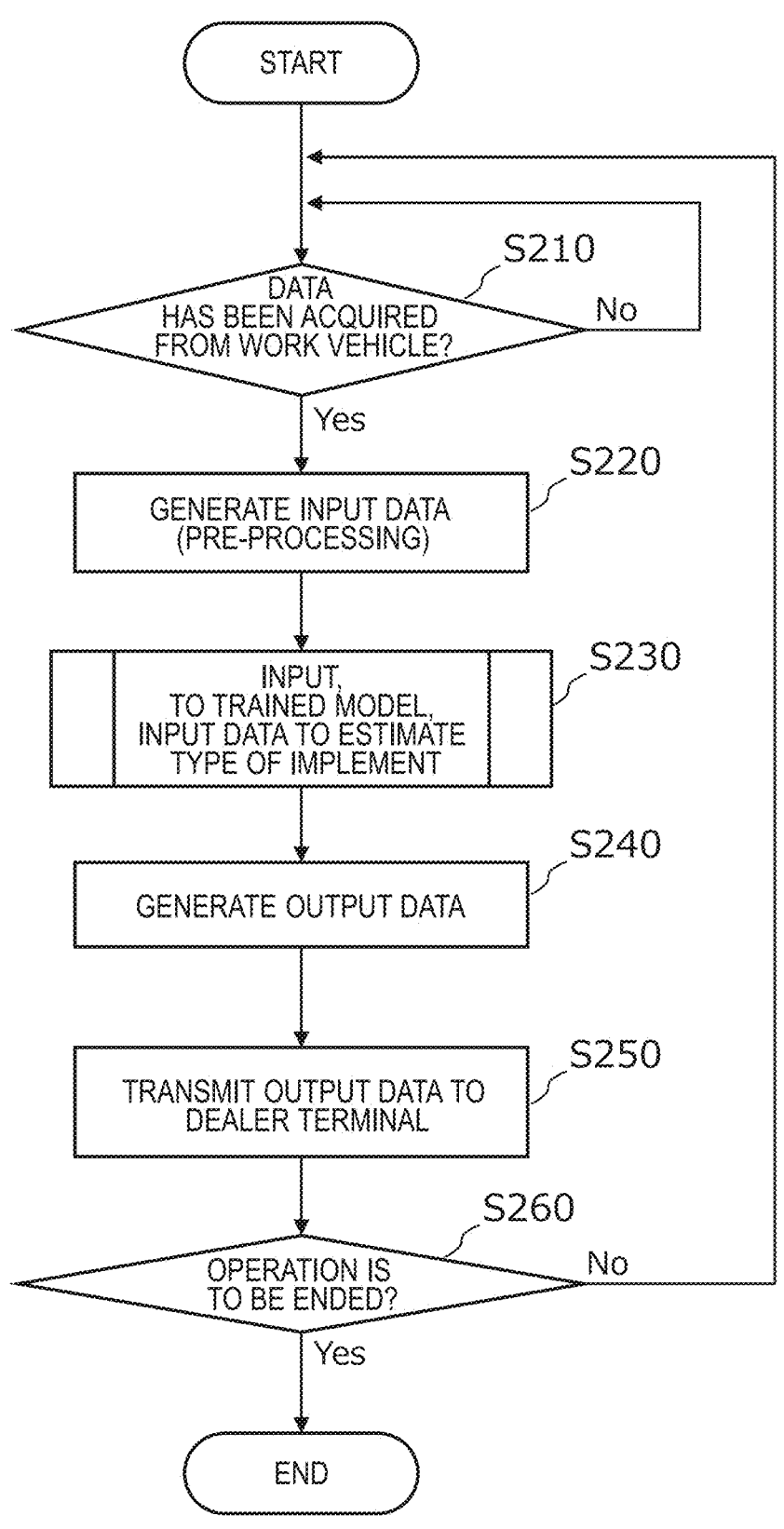
FIG. 7 is a flowchart for illustrating an example operation of the server.

FIG. 7 is a flowchart for illustrating an example operation of the server 600. The server 600 repeats the processing steps of from step S210 to step S260, to thereby sequentially estimate the type of the implement 300 connected to the work vehicle 100. This operation may be constantly performed during the operation of the work vehicle 100.

At step S210, the processing circuit 660 of the server 600 determines whether data has been acquired from the work vehicle 100 or not. As aforementioned, data including a plurality of signals may be transmitted from the work vehicle 100 at a predetermined time interval. When the data is received by the communication circuit 690, the control proceeds to step S220.

At step S220, the processing circuit 660 performs pre-processing based on the acquired data, and generates input data to be input to the trained model. The transmission data includes the values of the plurality of signals and the time information on each of the signals. The processing circuit 660 generates a plurality of pieces of chronological data corresponding to the plurality of signals based on the value of each of the signals and the time information thereon, which are included in the continuously acquired transmission data. The processing circuit 660 generates input data to be input to the trained model based on the chronological data.

FIG. 8 is a table for schematically showing an example of the chronological data. The chronological data shown in FIG. 8 is data in which the value of each of the plurality of signals is associated with a date and time (e.g., in seconds). In the example of FIG. 8, the values of signals S1, S2, S3, S4, . . . are associated with each second. The signals S1, S2, S3, S4, . . . represent respective signals of, for example, the vehicle speed, the rotational speed of the engine, the rotational speed of the PTO shaft, the height position of the three-point hitch, and the measurement value of the draft sensor. FIG. 8 shows four signals as an example, but the number of types of signals may be 10 or more, in a certain example, 50 or more, in another example, 100 or more, in still another example, 200 or more. The chronological data may be data for over a period of several seconds to several tens of seconds, in some cases, several hundred seconds, for example.

The signals that are transmitted from the work vehicle 100 may include a signal that is transmitted at a time interval of more than 1 second. For example, a signal that is transmitted every 10 seconds or a signal that is transmitted irregularly only when the value changes may be included. In such a signal, the processing circuit 660 may interpolate a value for a time for which the signal has no value, to thereby generate chronological data.

The processing circuit 660 uses such chronological data to generate input data including a plurality of feature amounts to be input to the trained model. Each feature amount may be a value itself of a signal, or a value obtained by averaging the values of the signal for over a certain time (e.g., 10 seconds, 30 seconds, or 60 seconds) or calculating a standard deviation thereof. Alternatively, each feature amount may be a value calculated by combining two or more signals in the chronological data. The input data may be a combination of, for example, 10 or more, 20 or more, 50 or more, 100 or more, or 200 or more feature amounts.

At step S230 illustrated in FIG. 7, the processing circuit 660 inputs the generated input data to one or more trained models to estimate the type of the implement 300 connected to the work vehicle 100. As aforementioned, the trained model may be generated and trained by a machine learning algorithm such as a decision tree.

Figure 9:
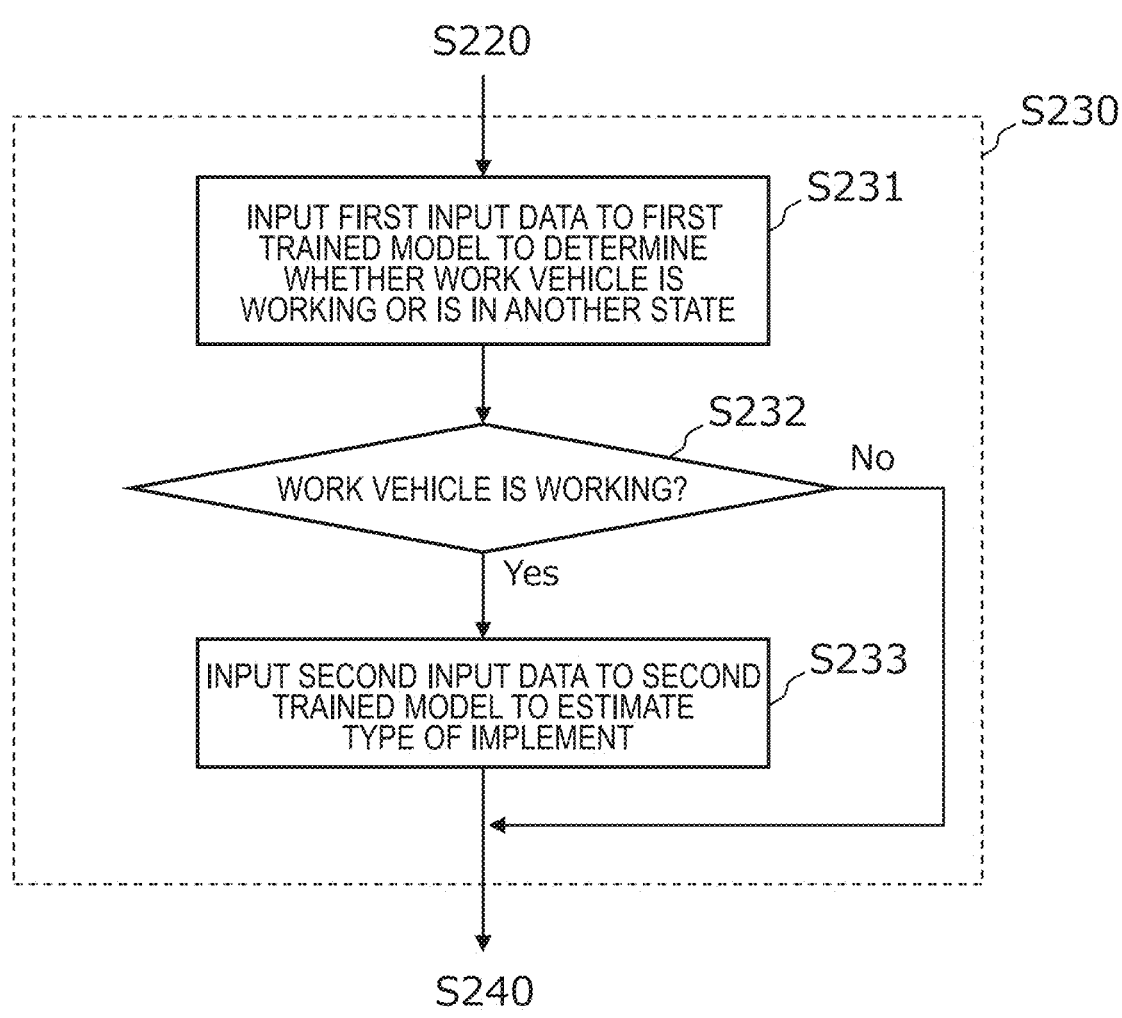
FIG. 9 is a flowchart for illustrating a more specific example of the processing step of step S230 of FIG. 7.

FIG. 9 is a flowchart for illustrating a more specific example of the processing step of step S230. In the example of FIG. 9, step S230 includes the processing steps of step S231, step S232, and step S233. In this example, the input data includes first input data and second input data, and the trained model includes the first model and the second model. The first input data and the second input data may be identical to or different from each other. The first model is a model usable to determine whether the work vehicle 100 is working or is in another state based on the first input data. The second model is a model usable to estimate the type of the implement 300 based on the second input data. Each of the first model and the second model is a model based on a machine learning algorithm such as a decision tree.

At step S231, the processing circuit 660 inputs the first input data to the first model to determine whether the work vehicle 100 is working or is in another state. The first model may be a model usable to determine which of states of working, traveling without working, turning on the headland, and idling the work vehicle 100 is in based on the first input data, for example. In that case, the processing circuit 660 can input the first input data to the first model, to thereby determine which of the states of working, traveling without working, turning on the headland, and idling the work vehicle 100 is in. Herein, the "working" refers to a state of driving the implement. The "traveling without working" refers to a state of traveling in a place other than on a headland, without driving the implement. The "turning on the headland" refers to a state of performing a turning operation on a headland outside a work area in order to reciprocate in a field. The "idling" refers to a state of being stopped while the engine is being rotated.

At step S232, the processing circuit 660 determines whether the work vehicle 100 is working or not based on a result of the determination performed at step S231. When the work vehicle 100 is working, the control proceeds to step S233. When the work vehicle 100 is in a state different from the state of working, step S230 is ended, and the control proceeds to step S240.

At step S233, the processing circuit 660 inputs the second input data to the second model to estimate the type of the implement 300 connected to the work vehicle 100. After step S233, the control proceeds to step S240.

In this manner, in the example of FIG. 9, step S230 of estimating the type of the implement 300 includes a first step (step S231) of inputting the first input data to the first model to determine whether the work vehicle 100 is working or is in another state and a second step (step S233) of inputting the second input data to the second model to estimate the type of the implement 300 when it has been determined that the work vehicle 100 is working. More specifically, the first step includes determining which of the states of working, traveling without working, turning on the headland, and idling the work vehicle 100 is in. When such two-step processing is performed, more accurate estimation can be performed than when the type of implement 300 is estimated at one step.

Figure 10:
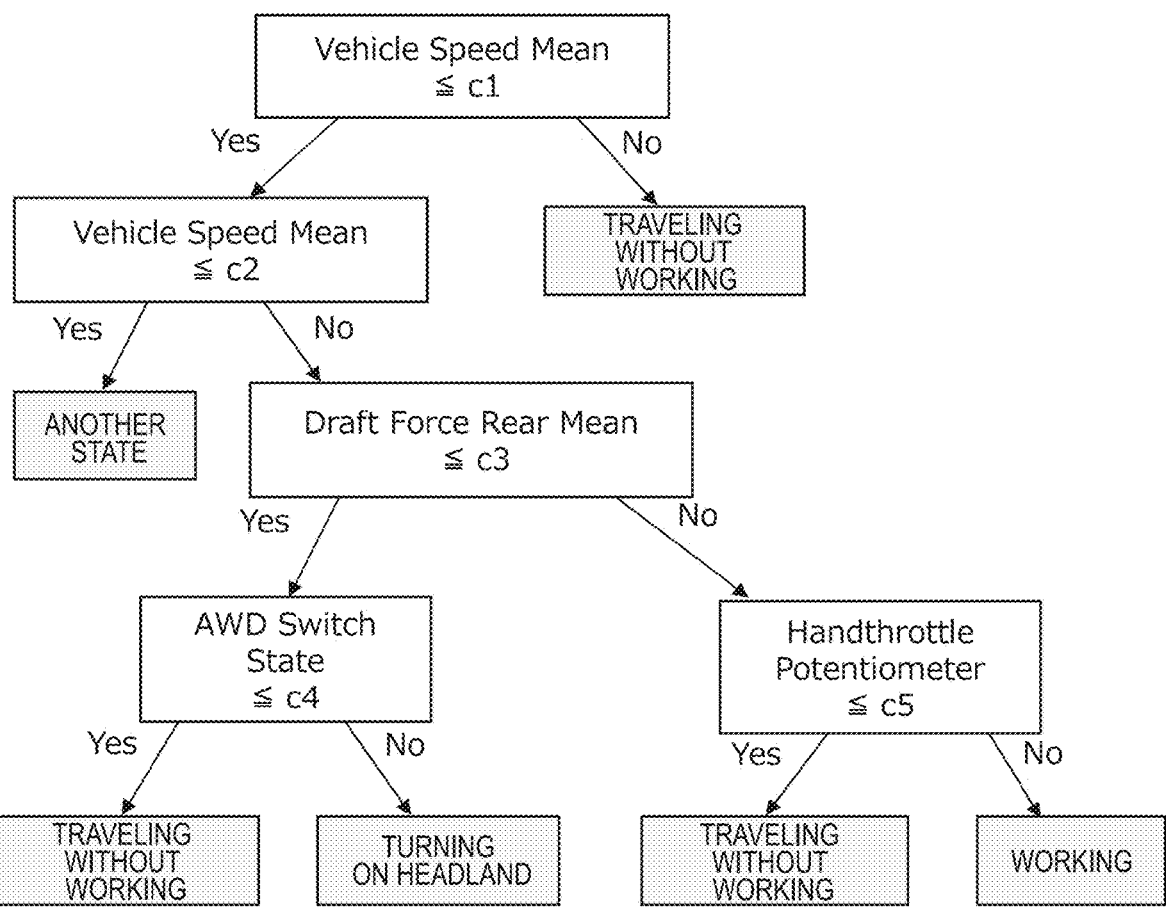
FIG. 10 is a diagram for exemplifying a decision tree which is an example of a trained model to be used for determination processing of a first step (step S231).

FIG. 10 is a diagram for exemplifying a decision tree which is an example of a trained model to be used to perform the determination processing of the first step (step S231). With this decision tree, which of the states of working, traveling without working, turning on the headland, and another state (e.g., idling) the work vehicle 100 is in is determined based on signals or feature amounts shown in Table 1, which are included in the input data.

TABLE 1

| Name | Meaning | Determination criterion |
|---|---|---|
| Draft Force Rear Mean | Average value of "Draft Force Rear" (strength of force acting on towing of tractor) for 10 seconds before and after | When "Draft Force Rear Mean" is large, the possibility of working is high. |
| Vehicle Speed Mean | Average value of vehicle speed for 10 seconds before and after | When "Vehicle Speed Mean" is high, the possibility of traveling without working is high. |
| AWD Switch State | Whether four-wheel drive is in progress or not | During four-wheel drive, the possibility of turning on the headland is high, while the possibility of being in the state of traveling without working is high when four-wheel drive is not in progress. |
| Hand Throttle Potentiometer | Position of hand accelerator | When the hand accelerator is in use, the possibility of working is high. |

In the example illustrated in FIGS. 10, c1, c2, c3, c4, and c5 each represent a certain constant, and are determined based on the decision tree algorithm. It is also possible to use software implementing the decision tree algorithm to display such results of the determination as exemplified in FIG. 10 on a display. For example, such display allows a user of the manufacturer computer 500 to know a basis for the estimation.

The aforementioned signals or feature amounts are only exemplary, and the state of the work vehicle 100 may be determined based on signals or feature amounts that are different from these. In the example of FIG. 10, the four types of feature amounts shown in Table 1 are used, but a larger number of feature amounts may be used to perform estimation based on a decision tree having deeper hierarchy levels. The order of determination based on the respective feature amounts is not limited to the shown order, and may be changed in accordance with an algorithm to be used or details of learning.

Figure 11:
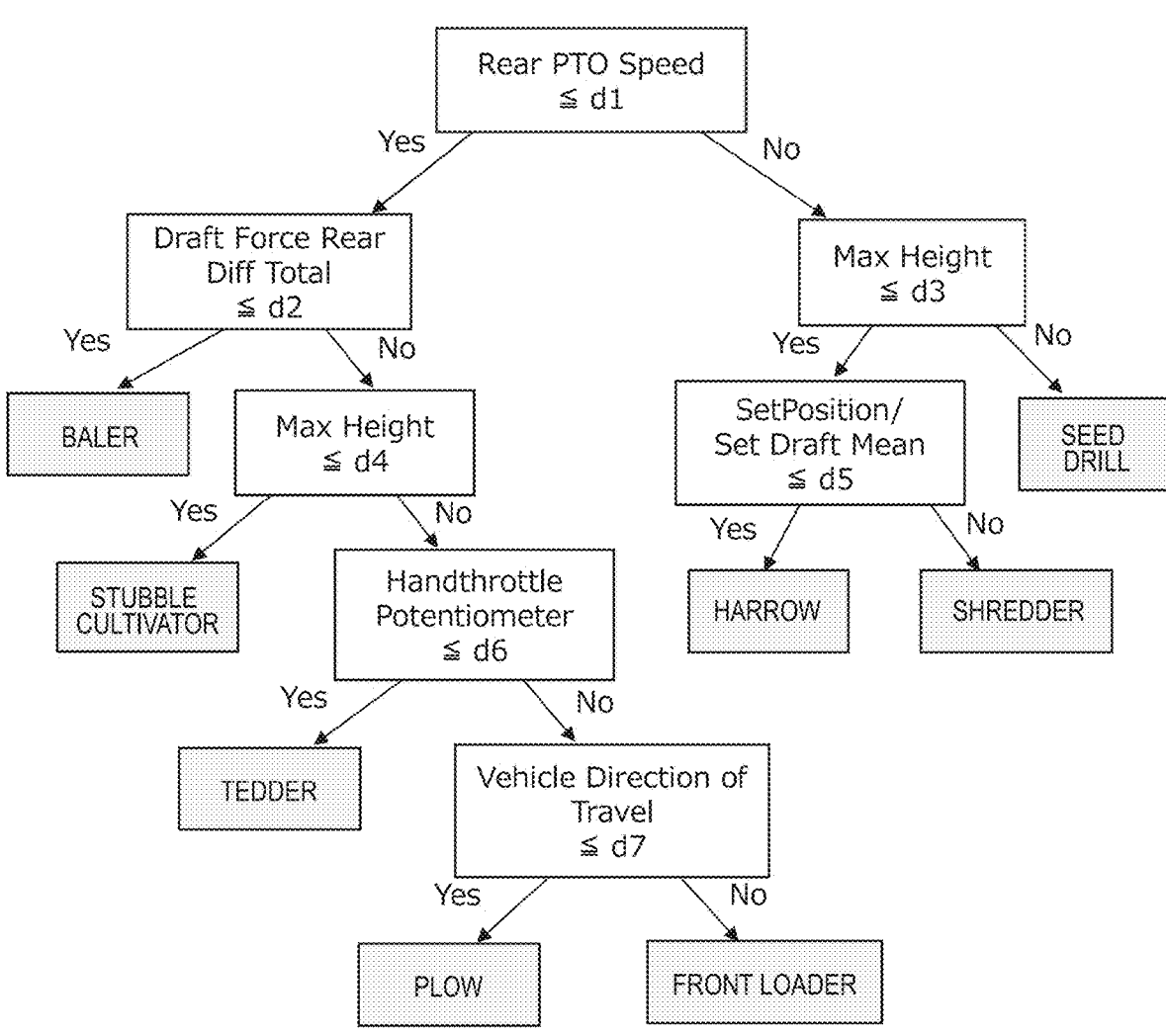
FIG. 11 is a diagram for illustrating a decision tree which is an example of a trained model to be used for determination processing of a second step (step S233).

FIG. 11 is a diagram for illustrating a decision tree which is an example of a trained model to be used for determination processing of the second step (step S233). With this decision tree, it is determined which of a baler, a seed drill, a harrow, a shredder, a stubble cultivator, a plow, a tedder, or a front loader the type of the implement 300 connected to the work vehicle 100 is. The type of the implement 300 is determined based on signals or feature amounts shown in Table 2, which are included in the input data.

TABLE 2

| Name | Meaning | Determination criterion |
| --- | --- | --- |
| Rear PTO Speed | Rotation speed (number of revolutions per minute) of PTO | It is possible to distinguish between implements having low and high rotational speeds of PTO |
| Draft Force Rear Diff Total | Integration of difference in "Draft Force Rear" by certain section | There is a high possibility that an implement that has a weak force acting on towing of a tractor (i.e., has a small towing resistance, e.g., due to a wheel(s) mounted to the implement) can be determined. |
| Max Height | Upper limit value of height of three-point hitch set by operator | It is possible to determine an implement having a different upper limit value of the height of a hitch (the upper limit value for an implement that does not raise or lower a hitch tends to be low). |
| Set Position/Set Draft Mean | Average value of values of user-set draft control (function of changing depth in order to keep workload constant) for 10 seconds | A depth of deep plowing changes depending on a magnitude of a workload, and hence a difference in the depth of deep plowing between implements can be detected. |
| Handthrottle Potentiometer | Position of hand accelerator | There is a possibility that an implement having a large value for the hand accelerator can be detected. |
| Vehicle Direction of Travel | Traveling direction of vehicle body | There is a possibility that an implement that can work without the vehicle body traveling forward, e.g., for pasture or spraying, can be detected. |

In the example illustrated in FIGS. 11, d1, d2, d3, d4, d5, d6, and d7 each represent a certain constant, and are determined based on the decision tree algorithm. It is also possible to use software implementing the decision tree algorithm to display such results of the determination as exemplified in FIG. 11 on a display. For example, such display allows a user of the manufacturer computer 500 to know a basis for the estimation.

The aforementioned signals or feature amounts are only exemplary, and the type of the implement 300 may be determined based on signals or feature amounts that are different from these. Further, a model that can determine not only a baler, a seed drill, a harrow, a shredder, a stubble cultivator, a plow, a tedder, and a front loader, but also other types of implements may be used. In the example of FIG. 11, the six types of feature amounts shown in Table 2 are used, but a larger number of feature amounts may be used to perform estimation based on a decision tree having deeper hierarchy levels. The order of determination based on the respective feature amounts is not limited to the shown order, and may be changed in accordance with an algorithm to be used or details of learning.

Figure 12:
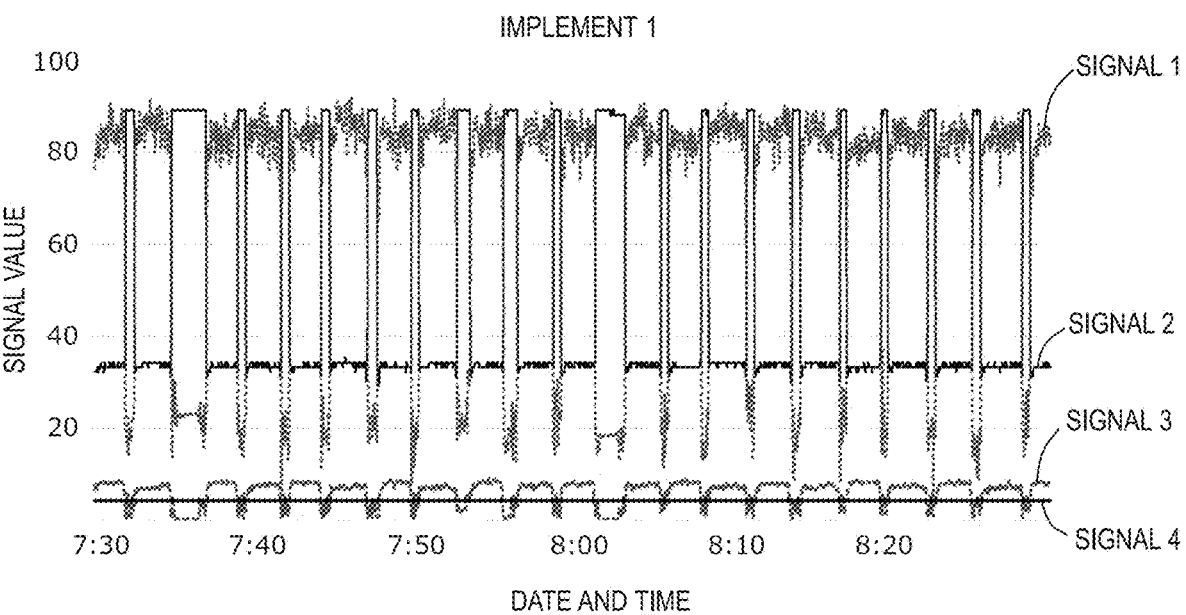
FIG. 12 is a graph for showing an example of a signal waveform in a case where the implement is a plow.
Figure 13:
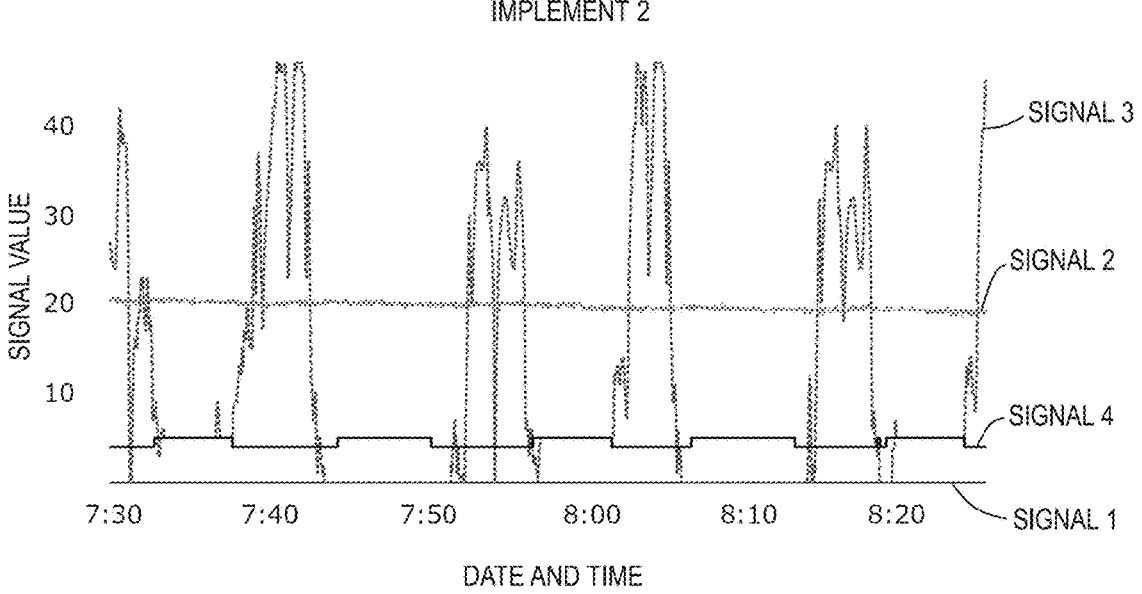
FIG. 13 is a graph for showing an example of a signal waveform in a case where the implement is a slurry tanker.
Figure 14:
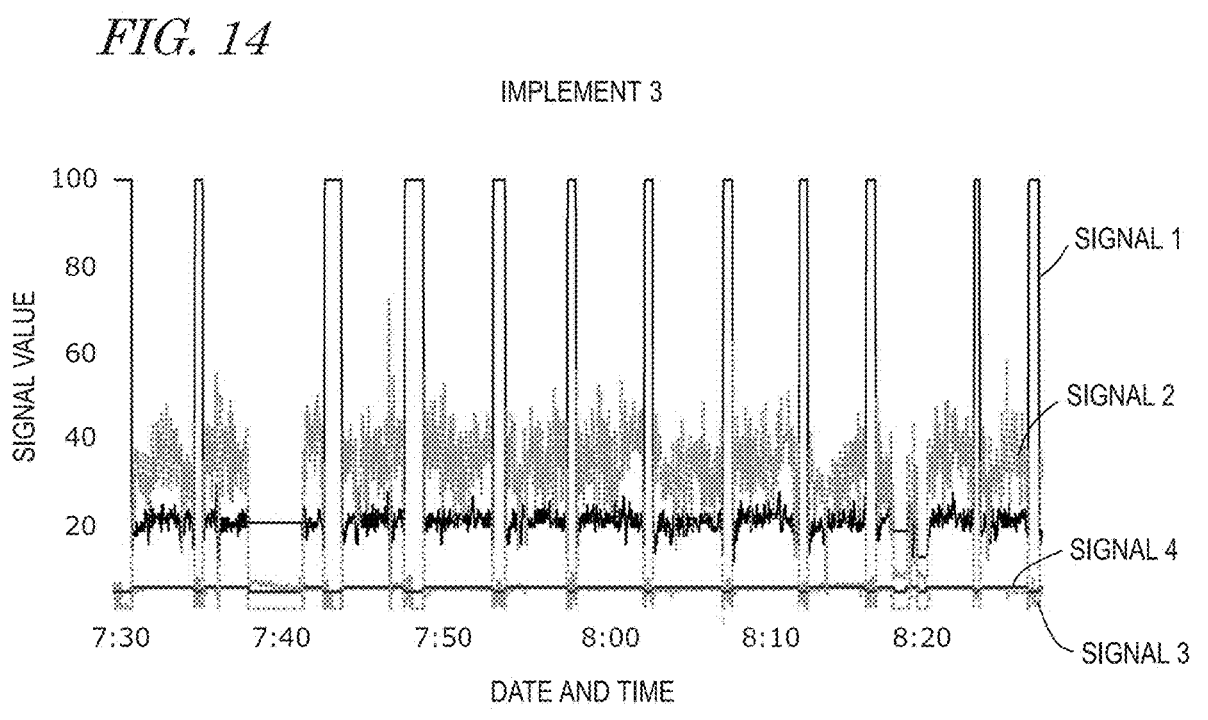

Herein, with reference to FIG. 12 to FIG. 14, examples of signal waveforms that differ depending on the type of the implement 300 are described.

FIG. 12 shows an example of a signal waveform in a certain implement 300 (hereinafter referred to as "implement 1"). FIG. 13 shows an example of a signal waveform in another implement 300 (hereinafter referred to as "implement 2"). FIG. 14 shows an example of a signal waveform in still another implement 300 (hereinafter referred to as "implement 3"). The implement 1, the implement 2, and the implement 3 are different types of implements, and applications of these implements are different from one another. FIG. 12, FIG. 13, and FIG. 14 exemplify waveforms showing changes over time of four signals (signal 1, signal 2, signal 3, and signal 4). The signals 1 to 4 represent signals such as a height of a three-point hitch, a measurement value of a draft sensor, a vehicle speed, and a value of a PTO indicator lamp. More signals may be used in practice, but FIG. 12 to FIG. 14 show the waveforms of the four signals as examples. As can be seen from these graphs, when the implements 300 differ in the type, the waveforms of the respective signals greatly differ from one another. In the present example embodiment, through use of a machine learning model usable to estimate the type of implement 300 based on the difference among these signal waveforms, it is possible to estimate the type of the implement 300 connected to the work vehicle 100 with a high accuracy.

Referring again to FIG. 7, when the processing step of step S230 is ended, the control proceeds to step S240.

At step S240, the processing circuit 660 generates output data including information on the state (e.g., working, traveling without working, turning on the headland, or idling) of the work vehicle 100 and the type of the implement 300 connected to the work vehicle 100, which have been estimated at step S230. The output data may be data in which, for example, the year/month/day, time (e.g., in seconds), vehicle ID, estimated state of the work vehicle 100, and estimated type of the implement 300 are associated with one another. In addition, the output data may include the position of the work vehicle 100 measured by the GNSS unit 120 and the measurement values (e.g., the vehicle speed, fuel remaining amount, fuel rate, and total operation hours) of one or more sensors included in the sensors 150.

At step S250, the processing circuit 660 transmits the output data to the dealer terminal 400 via the communication circuit 690. The dealer terminal 400 records the transmitted output data in the storage 450. In response to an operation performed by a user (e.g., a person in charge at the dealer), the dealer terminal 400 can generate and display an image indicating the operating state of the work vehicle 100 based on the output data.

At step S260, the processing circuit 660 determines whether to end the operation or not. For example, when an instruction to end the operation is given from an external computer such as the manufacturer computer 500, it is determined that the operation is to be ended. The instruction to end the operation may be given, for example, when the estimation operation is stopped in order to further train the trained model through use of new data for learning. The processing steps of from step S210 to step S260 are repeated until the instruction to end the operation is given.

In the example of FIG. 7, the generation of output data at step S240 and the transmission of the output data at step S250 are continuously performed after step S230. In this case, output data is generated and transmitted at the same frequency as the frequency of receiving data from the work vehicle 100 (e.g., every second). Instead of such an operation, for example, the generation and transmission of output data at step S240 and step S250 may be performed after the estimation processing has been ended a plurality of times. The generation and transmission of output data may be collectively performed every predetermined time, for example, once every 10 seconds or once every 100 seconds. Alternatively, the processing circuit 660 may generate output data, and transmit the output data to the dealer terminal 400, only when the processing circuit 660 is requested by the dealer terminal 400.

Next, an operation for displaying the operating state of the work vehicle 100 performed by the dealer terminal 400 is described.

Figure 15:
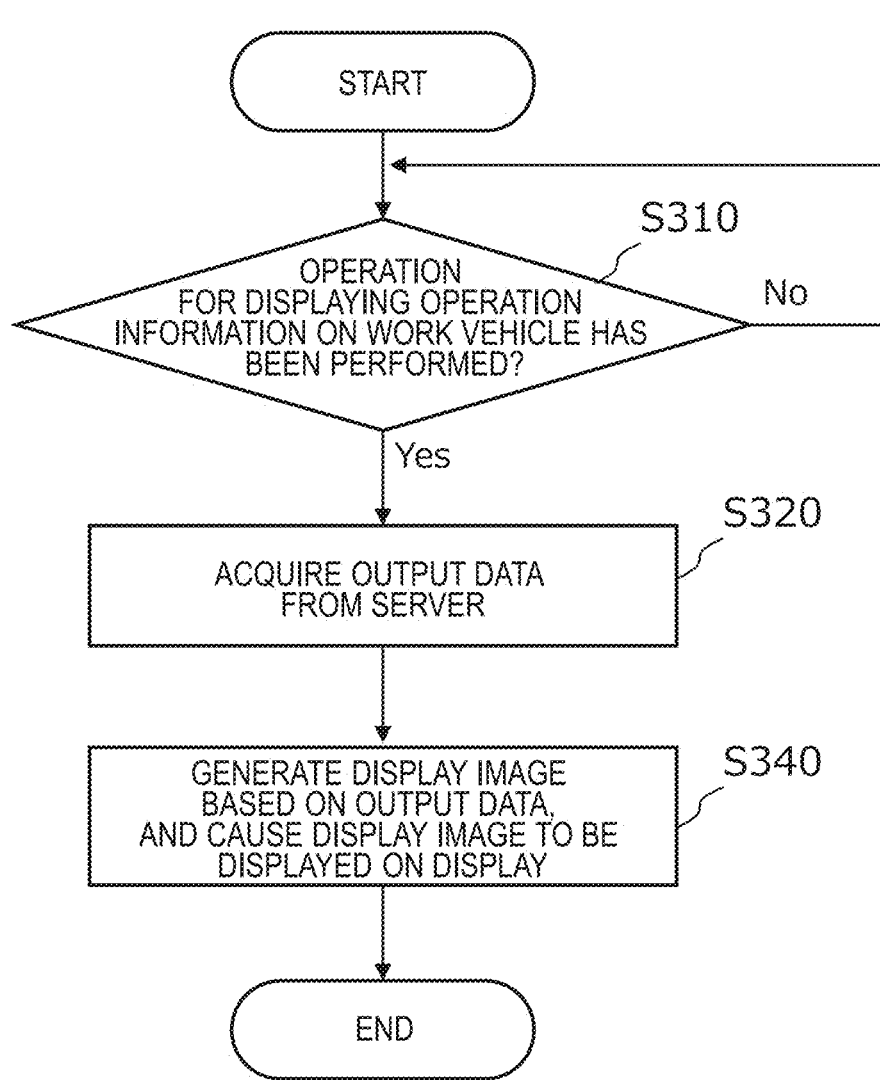
FIG. 15 is a flowchart for illustrating an example operation to be executed by a processing circuit of the dealer terminal.

FIG. 15 is a flowchart for illustrating an example operation to be executed by the processing circuit 460 of the dealer terminal 400.

At step S310, the processing circuit 460 determines whether an operation for displaying operation information on the work vehicle 100 has been performed via the input interface 420 or not. This operation may be performed by, for example, a person in charge of maintenance of the work vehicle 100 at a dealer. When this operation has been performed, the control proceeds to step S320.

At step S320, the processing circuit 460 acquires the output data transmitted from the server 600 by reading out the output data from the storage 450. The server 600 may be configured or programmed to transmit the output data to the dealer terminal 400 in response to a request received from the dealer terminal 400. In that case, the processing circuit 460 requests the server 600 for the output data via the communication circuit 490, to thereby acquire the output data.

At step S340, the processing circuit 460 generates, based on the output data, a display image including the information indicating the operating state of the work vehicle 100 in chronological order, and causes the display 430 to display the display image.

Figure 16:
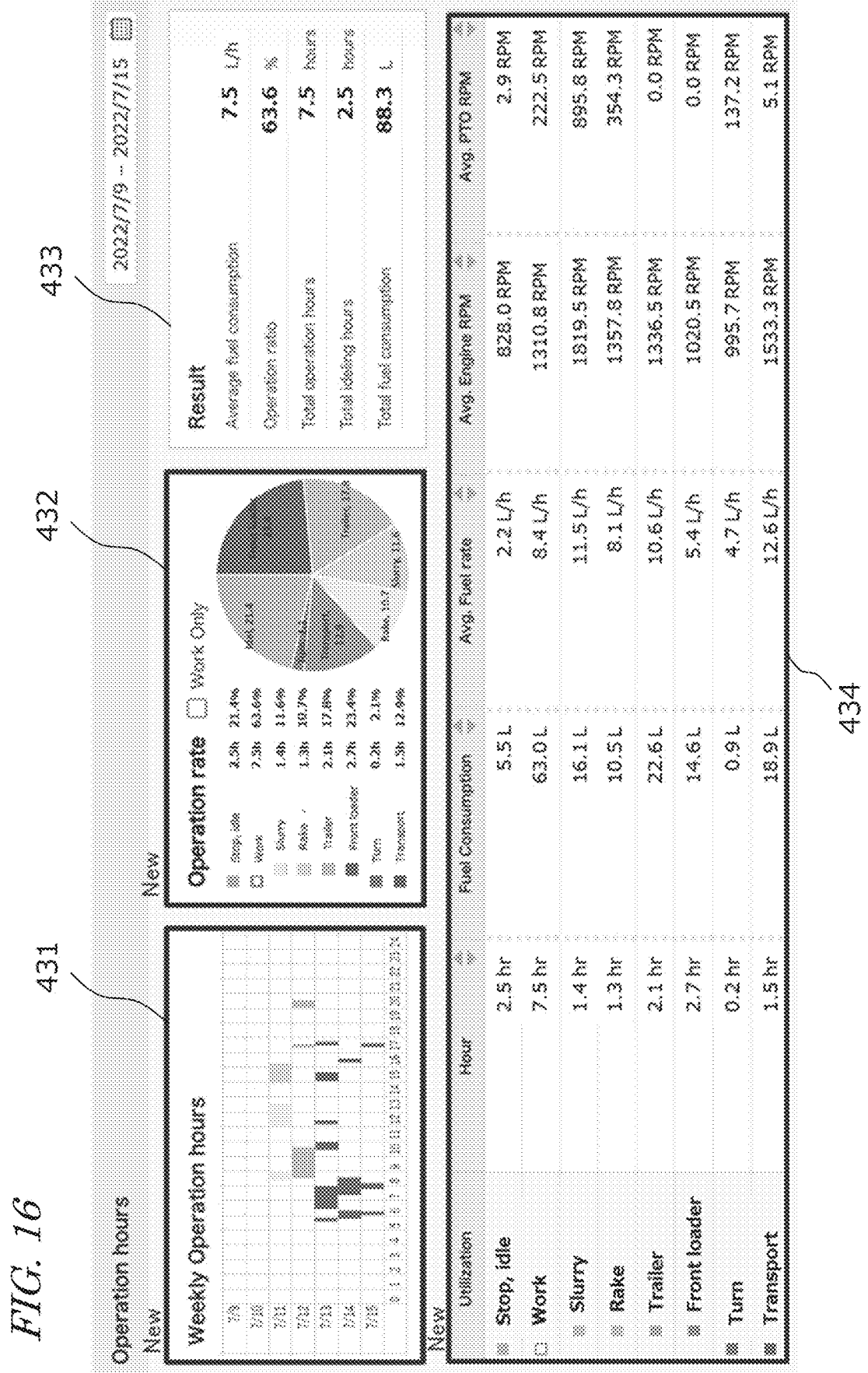
FIG. 16 is a view for illustrating an example of an image to be displayed on a display.

FIG. 16 is a view for illustrating an example of an image to be displayed on the display 430. The display image in this example includes a plurality of display areas 431, 432, 433, and 434. The display area 431 shows which date and time the work vehicle 100 worked in. The display area 432 shows an operation rate of each implement for a certain period. The display area 433 shows a fuel consumption amount per hour (average fuel consumption), an operation ratio, operation hours, idling hours, and a fuel consumption amount for that period. The display area 434 shows detailed operation information on the work vehicle 100 for that period. In the display area 434, information on hours, a fuel consumption amount, an average fuel rate, an average number of revolutions (RPM) of the engine, and an average number of revolutions (RPM) of PTO is displayed for each of the state in which the work vehicle 100 is stopped (idling state), the state of working, the state of turning on the headland, and the state of traveling without working. In regard to the state of working, the information on these items is displayed for each type of the used implement.

The display of such information allows the person in charge at the dealer to grasp how the work vehicle 100 is being used. Therefore, for example, a failure or a malfunction of the work vehicle 100 or a sign thereof can be detected in an early stage, thus allowing for efficient maintenance such as replacement or repair of parts.

A display screen illustrated in FIG. 16 is only exemplary, and a layout of the display screen is not limited to that illustrated in FIG. 16. What kind of display to perform based on the data that is transmitted from the server 600 is determined as appropriate in accordance with a purpose.

In the present example embodiment, the dealer terminal 400 generates and displays a display image based on the output data transmitted from the server 600, but a similar operation may be performed by the manufacturer computer 500. For example, in response to a request received from the manufacturer computer 500, the server 600 may transmit the output data including the result of the estimation of the implement to the manufacturer computer 500. The manufacturer computer 500 may display such a display image as illustrated in FIG. 16 on the display based on the output data. Such display allows the person in charge at the manufacturer to obtain knowledge about how the work vehicle 100 is actually used, and hence such knowledge can be made use of for future product development or services.

An operation similar to that of the dealer terminal 400 may be performed by a terminal device that is used by a user or an owner (e.g., a farmer) of the work vehicle 100. For example, in response to a request received from the terminal device, the server 600 may transmit the output data including the result of the estimation of the implement to the terminal device. The terminal device may display such a display image as illustrated in FIG. 16 on the display based on the output data. Such display allows, for example, the farmer to examine how the work vehicle 100 is being used and make use thereof for improvement in future agricultural management. For example, when it is found that the work vehicle 100 used by an employee is idling too frequently, it is possible to suppress the fuel consumption amount by instructing the employee to reduce idling. Meanwhile, when it is found that there are too many turns on headlands, it is possible to make determination to introduce a wider implement to reduce the number of turns or to introduce a larger work vehicle.

Similar determination may be made by the person in charge at the dealer. When the person in charge at the dealer views such a display screen as illustrated in FIG. 16 to find that there are too many turns on headlands, for example, the person in charge at the dealer can propose the introduction of a wider implement or a larger work vehicle. This can not only increase efficiency of maintenance work but also improve sales activities.

In the above preferred example embodiment, the system includes one or more work vehicles 100, the server 600, the dealer terminal 400, and the manufacturer computer 500, which is only exemplary. For example, the system may include only part of these devices. Further, each of the server 600, the dealer terminal 400, and the manufacturer computer 500 may be any other type of computer. For example, both the server 600 and the manufacturer computer 500 may be computers that are managed by the manufacturer of the work vehicles 100. Further, a company different from the manufacturer of the work vehicles 100 may sell or operate a communication device that is installed in each work vehicle 100 or a computer that collects signals from the communication device and executes the estimation processing in the present example embodiment. Such a company may further use a terminal device similar to that of the dealer terminal 400 to monitor the operating state of each work vehicle 100, thus providing services such as maintenance.

A computer program that defines a method to be executed by each device in the above example embodiment may be manufactured and sold independently from the device. The computer program may be provided in a form stored in a computer-readable, non-transitory storage medium, for example. The computer program may also be provided through downloading via telecommunication lines (e.g., the Internet).

The techniques and example embodiments according to the present disclosure are applicable to work vehicles, e.g., tractors, transplanters, harvesters, construction vehicles, or snowplow vehicles, communication devices installed in the work vehicles, and processing devices that communicate with the work vehicles.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method to be executed by a processing device external to a work vehicle to execute work by driving an implement connected to the work vehicle, the method comprising:
   repeatedly acquiring, from the work vehicle, a plurality of signals respectively indicating different internal states of the work vehicle, the plurality of signals including a signal indicating a measurement value of a draft sensor to measure a load involved in towing of the implement, a signal indicating a traveling speed of the work vehicle, a signal indicating a rotational speed of a power take-off (PTO) shaft to drive the implement, a signal indicating a height position of a linkage device that links the implement, and a signal indicating a rotational speed of a prime mover;
   generating input data based on the plurality of signals;
   estimating a type of the implement by inputting the input data to one or more trained models usable to estimate the type of the implement based on the input data; and
   generating output data including information indicating the estimated type of the implement and outputting the output data.

2. The method of claim 1, wherein the generating of the input data includes generating a plurality of pieces of time-series data each corresponding to a respective one of the plurality of signals and generating the input data based on the plurality of pieces of time-series data.

3. The method of claim 1, wherein
   the input data includes first input data and second input data;
   the one or more trained models include a first model usable to determine whether the work vehicle is working or is in another state based on the first input data and a second model usable to estimate the type of the implement based on the second input data; and
   the estimating includes:
   a first step of inputting the first input data to the first model to determine whether the work vehicle is working or is in another state; and
   a second step of inputting the second input data to the second model to estimate the type of the implement when it has been determined that the work vehicle is working.

4. The method of claim 3, wherein
   the first model includes a model usable to determine based on the first input data which of states of working, traveling without working, turning on a headland, and idling the work vehicle is in; and the first step includes inputting the first input data to the first model to determine which of states of working, traveling without working, turning on a headland, and idling the work vehicle is in.

5. The method of claim 3, wherein each of the first model and the second model includes a model based on a decision tree.

6. The method of claim 1, wherein each of the plurality of signals is generated based on a signal flowing through a Control Area Network bus in the work vehicle.

7. The method of claim 1, wherein the outputting includes transmitting the output data to a terminal device configured or programmed to communicate with the processing device.

8. The method of claim 7, wherein
   the terminal device is used by a monitor who performs one of condition monitoring, maintenance, or failure diagnosis of the work vehicle;
   the output data is used to cause a display of the terminal device to display information indicating an operating state of the work vehicle; and
   the information indicating the operating state includes information indicating which date and time the work vehicle worked in, and an operation rate of each implement used by the work vehicle for a certain period.

9. The method of claim 1, wherein the work vehicle includes an agricultural tractor and is configured to execute farm work by driving the implement.

10. A processing device external to a work vehicle to execute work by driving an implement connected to the work vehicle, the processing device comprising:
   a communication circuit configured or programmed to repeatedly receive, from the work vehicle, a plurality of signals respectively indicating different internal states of the work vehicle, the plurality of signals including a signal indicating a measurement value of a draft sensor to measure a load involved in towing of the implement, a signal indicating a traveling speed of the work vehicle, a signal indicating a rotational speed of a power take-off (PTO) shaft to drive the implement, a signal indicating a height position of a linkage device that links the implement, and a signal indicating a rotational speed of a prime mover; and
   a processing circuit configured or programmed to:
   generate input data based on the plurality of signals;
   estimate a type of the implement by inputting the input data to one or more trained models usable to estimate the type of the implement based on the input data; and
   generate output data including information indicating the estimated type of the implement and output the output data.

11. A terminal device that communicates with the processing device of claim 10, the terminal device comprising:
   another communication circuit configured or programmed to receive the output data from the processing device; and
   another processing circuit configured or programmed to cause a display to display information indicating an operating state of the work vehicle based on the output data, the information indicating the operating state including information indicating which date and time the work vehicle worked in, and an operation rate of each implement used by the work vehicle for a certain period.

12. A system comprising:
   the processing device of claim 10; and

a communication device that is installed in a work vehicle and that communicates with the processing device, the work vehicle being configured to execute work by driving an implement connected to the work vehicle, the communication device including:

another processing circuit configured or programmed to generate data including the plurality of signals respectively indicating the different internal states of the work vehicle; and another communication circuit configured or programmed to transmit the data to the processing device.

13. A system comprising:

the processing device of claim 10; and a work vehicle including a communication device that is installed therein and that communicates with the processing device, the work vehicle being configured to execute work by driving an implement connected to the work vehicle, the communication device including:

another processing circuit configured or programmed to generate data including the plurality of signals respectively indicating the different internal states of the work vehicle; and another communication circuit configured or programmed to transmit the data to the processing device.

14. The system of claim 12, further comprising a terminal device that communicates with the processing device, the terminal device including:

another communication circuit configured or programmed to receive the output data from the processing device; and a processing circuit configured or programmed to cause a display to display information indicating an operating state of the work vehicle based on the output data, the information indicating the operating state including information indicating which date and time the work vehicle worked in, and an operation rate of each implement used by the work vehicle for a certain period.

15. A non-transitory computer-readable medium including a computer program to be executed by a computer external to a work vehicle to execute work by driving an implement connected to the work vehicle, the computer program causing the computer to execute:

repeatedly receiving, from the work vehicle, a plurality of signals respectively indicating different internal states of the work vehicle, the plurality of signals including a signal indicating a measurement value of a draft sensor to measure a load involved in towing of the implement, a signal indicating a traveling speed of the work vehicle, a signal indicating a rotational speed of a power take-off (PTO) shaft to drive the implement, a signal indicating a height position of a linkage device that links the implement, and a signal indicating a rotational speed of a prime mover;

generating input data based on the plurality of signals;

estimating a type of the implement by inputting the input data to one or more trained models usable to estimate the type of the implement based on the input data; and generating output data including information indicating the estimated type of the implement and outputting the output data.

* * * * *